(12) United States Patent
Aoki et al.

(10) Patent No.: US 8,934,165 B2
(45) Date of Patent: Jan. 13, 2015

(54) ELECTROPHORETIC PARTICLE, MANUFACTURING METHOD OF ELECTROPHORETIC PARTICLE, ELECTROPHORETIC DISPERSED LIQUID, ELECTROPHORETIC SHEET, ELECTROPHORETIC APPARATUS, AND ELECTRONIC EQUIPMENT

(71) Applicant: Seiko Epson Corporation, Tokyo (JP)

(72) Inventors: Takashi Aoki, Suwa (JP); Harunobu Komatsu, Matsumoto (JP); Shinobu Yokokawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 13/848,253

(22) Filed: Mar. 21, 2013

(65) Prior Publication Data

US 2013/0265632 A1 Oct. 10, 2013

(30) Foreign Application Priority Data

Apr. 9, 2012 (JP) ................................. 2012-088855

(51) Int. Cl.
*G02B 26/00* (2006.01)
(52) U.S. Cl.
USPC .......................................... 359/296; 359/290
(58) Field of Classification Search
USPC ........................... 359/290–298; 345/105, 107; 430/32–38; 204/450, 600
See application file for complete search history.

(56) References Cited

U.S. PATENT DOCUMENTS

| 7,265,895 B2 * | 9/2007 | Miyazaki et al. ............. 359/296 |
| 2005/0267252 A1 | 12/2005 | Minami |
| 2005/0267263 A1 | 12/2005 | Minami |
| 2007/0195402 A1 | 8/2007 | Miyazawa |
| 2010/0073280 A1 | 3/2010 | Akashi et al. |
| 2013/0182311 A1 * | 7/2013 | Mochizuki et al. ........... 359/296 |

FOREIGN PATENT DOCUMENTS

| JP | A-2004-18556 | 1/2004 |
| JP | A-2005-345511 | 12/2005 |
| JP | A-2005-352053 | 12/2005 |
| JP | A-2007-225732 | 9/2007 |
| JP | A-2010-78871 | 4/2010 |

* cited by examiner

*Primary Examiner* — Mohammed Hasan
(74) *Attorney, Agent, or Firm* — Oliff PLC

(57) ABSTRACT

An electrophoretic particle of the invention include: a mother particle; and a covering layer, wherein the covering layer includes a plurality of polymers, each of which includes a polymerization initiator which includes a polymerization initiation group linked to a surface of the mother particle and polymerization parts in which monomers are polymerized from the polymerization initiation group as a starting point, wherein each of the polymer include the polymerization initiator, a first polymerization part, which is coupled to the polymerization initiator, in which first monomers that includes monomers with cross-linking groups are polymerized, and a second polymerization part in which second monomers that does not include monomers with cross-linking groups are polymerized, and the polymers are linked to each other at the cross-linking groups of the first polymerization parts via cross-linking agent.

20 Claims, 7 Drawing Sheets

ELECTROPHORETIC PARTICLE, MANUFACTURING METHOD OF ELECTROPHORETIC PARTICLE, ELECTROPHORETIC DISPERSED LIQUID, ELECTROPHORETIC SHEET, ELECTROPHORETIC APPARATUS, AND ELECTRONIC EQUIPMENT

BACKGROUND

1. Technical Field

The present invention relates to an electrophoretic particle, a manufacturing method of an electrophoretic particle, electrophoretic dispersed liquid, an electrophoretic sheet, an electrophoretic apparatus, and electronic equipment.

2. Related Art

Generally, it has been known that microparticles move (migrate) in liquid due to coulomb force if an electric field is made to act on a dispersed system obtained by dispersing the microparticles in liquid. This phenomenon is called electrophoresis, and in recent years an electrophoretic display apparatus which displays desired information (image) by using the electrophoresis has attracted attention as a new type of display apparatus.

This electrophoretic display apparatus has a characteristic that the apparatus is provided with a display memory property in a state where voltage application is stopped and a wide viewing angle property, a characteristic that the apparatus can perform high-contrast display with low power consumption, and the like.

In addition, the electrophoretic display apparatus also has a characteristic that display thereof is easy on eyes as compared with light emitting display devices such as a cathode-ray tube display since the electrophoretic display apparatus is a non-light-emitting type device.

As such an electrophoretic display device, a device which is provided with dispersion of electrophoretic particles in solvent as electrophoretic dispersed liquid which is arranged between a pair of substrates with electrodes has been known.

As such electrophoretic dispersed liquid with the above configuration, liquid including positively-charged particles and negatively-charged particles, and non-charged particles as necessary, as the electrophoretic particles is used, and desired information (image) can be thus displayed by applying voltage between the pair of substrates (electrodes).

Here, electrophoretic particles which are provided with covering layers in which polymer molecules are coupled to base particles are generally used as the electrophoretic particles, and with such a configuration including the covering layers (polymer molecules), it is possible to disperse and charge the electrophoretic particles in the electrophoretic dispersed liquid.

An electrophoretic particle with such a configuration is manufactured by using atom transfer radical polymerization (ATRP) as follows.

That is, the electrophoretic particle is manufactured by preparing a base particle, a linking polymerization initiator containing a polymerization initiation group to the surface of the base particle, then forming a polymerization part at which a monomer has been polymerized in living radical polymerization from the polymerization initiation group as a starting point, and providing a polymer molecule (polymer) with characteristics such as an electrification property and a dispersion property (see JP-A-2007-225732, for example).

However, according to the electrophoretic particle manufactured by using such ATRP, the polymer molecule is coupled to the base particle only at one end. Therefore, the polymer molecule is separated from the base particles from the coupling part, at which one end of the polymer molecule and the base particle has been coupled to each other, as a starting point, due to a physical influence of collision between electrophoretic particles resulted from vibration or due to a chemical influence originated from solvent in which the electrophoretic particles are dispersed in the course of manufacturing the electrophoretic apparatus or in the process of using the electrophoretic apparatus. As a result, there is a problem that variations occur in the electrification property, the dispersion property, and the like among the plurality of electrophoretic particles contained in the electrophoretic dispersed liquid when the electrophoretic apparatus is manufactured and used.

SUMMARY

An advantage of some aspects of the invention is to provide an electrophoretic particle which has a stable electrification property and dispersion property over a long time in electrophoretic dispersed liquid, a manufacturing method of an electrophoretic particle, according to which it is possible to manufacture an electrophoretic particle capable of exhibiting such a function, and highly reliable electrophoretic dispersed liquid, an electrophoretic sheet, an electrophoretic apparatus, and electronic equipment using such an electrophoretic particle.

Such an advantage can be achieved by the following aspects of the invention.

According to an aspect of the invention, there is provided an electrophoretic particle including: a mother particle; and a covering layer which covers at least a part of the mother particle, wherein the covering layer includes a plurality of polymers, each of the polymers including a polymerization initiator which includes a polymerization initiation group linked to a surface of the mother particle and polymerization parts in which monomers are polymerized in living radical polymerization from the polymerization initiation group as a starting point, and wherein each of the polymers includes the polymerization initiator, a first polymerization part, which is coupled to the polymerization initiator, in which first monomers that include monomers with cross-linking groups are polymerized in living radical polymerization, and a second polymerization part, which is coupled to the first polymerization part, in which second monomers that does not include monomers with cross-linking groups are polymerized in living radical polymerization, and the polymers are linked to each other at the cross-linking groups of the first polymerization parts via cross-linking agent.

With the above configuration, it is possible to obtain an electrophoretic particle which has a stable electrification property and dispersion property for a long time in electrophoretic dispersed liquid.

It is preferable that the first monomers include monomers containing epoxy groups as the cross-linking groups.

Since the epoxy groups have especially high reactivity, it is possible to more reliably cross-link the cross-linking groups via the cross-linking agent.

It is preferable that the second monomers include non-ionic monomers.

With such a configuration, it is possible to disperse the electrophoretic particles in the electrophoretic dispersed liquid without agglutinating the electrophoretic particles.

It is preferable that the second monomers include cationic monomers.

With such a configuration, it is possible to apply a positive electrification property to the electrophoretic particles in the electrophoretic dispersed liquid.

It is preferable that the second monomers include anionic monomers.

With such a configuration, it is possible to apply a negative electrification property to the electrophoretic particles in the electrophoretic dispersed liquid.

It is preferable that the polymerization initiator be silane coupling agent.

In the case of the silane coupling agent, it is possible to reliably link the polymerization initiation groups to the surface of the mother particle via the linking groups such as alkoxysilyl groups included in the silane coupling agent.

It is preferable that the polymerization initiation groups be polymerized in atom transfer radical polymerization.

With such a configuration, it is possible to simply and efficiently progress the living radical polymerization, in which the polymerization initiation groups and the monomers react, with high controllability at low cost.

It is preferable that a linkage degree of the polymers to the surface of the mother particle be not less than 0.01 chains/nm$^2$ and not more than 0.5 chains/nm$^2$.

With such a configuration, it is possible to more reliably cross-link the cross-linking groups and to thereby obtain the electrophoretic particles which are excellent in both a dispersion ability and a migratory ability in the electrophoretic dispersed liquid.

According to another aspect of the invention, there is provided a manufacturing method of an electrophoretic particle which includes a mother particle and a covering layer which covers at least a part of the mother particle, the method including: preparing the mother particle and linking a plurality of polymerization initiators with polymerization initiation groups to a surface of the mother particle in a first process; and polymerizing first monomers with cross-linking groups in living radical polymerization from the polymerization initiation groups as starting points, then polymerizing second monomers with no cross-linking groups in living radical polymerization, coupling the cross-linking groups via cross-linking agent, and forming polymerization parts configured by first polymerization parts and second polymerization parts to obtain a plurality of polymers in a second process.

With such a configuration, it is possible to form an electrophoretic particle which has the stable electrification property and dispersion property for a long time in the electrophoretic dispersed liquid.

It is preferable that in the second process, the cross-linking groups be linked via the cross-linking agent prior to the polymerization of the second monomers.

With such a configuration, it is possible to easily cause the cross-linking agent to reach the first polymerization parts positioned on the side of the mother particle and to thereby more reliably link the cross-linking group included in the plurality of first polymerization parts via the cross-linking agent.

According to still another aspect of the invention, there is provided electrophoretic dispersed liquid including: the electrophoretic particle according to the invention or the electrophoretic particles manufactured by the manufacturing method of an electrophoretic particle according to the invention.

With such a configuration, it is possible to obtain the electrophoretic dispersed liquid including the electrophoretic particles which are excellent in both the dispersion ability and the migratory ability.

According to still another aspect of the invention, there is provided an electrophoretic sheet including: a substrate; and a plurality of constituents which are arranged above the substrate to respectively accommodate the electrophoretic dispersed liquid.

With such a configuration, it is possible to obtain the electrophoretic sheet with a high performance and reliability.

According to still another aspect of the invention, there is provided an electrophoretic apparatus including: the electrophoretic sheet according to the invention.

With such a configuration, it is possible to obtain the electrophoretic apparatus with a high performance and reliability.

According to still another aspect of the invention, there is provided electronic equipment including: the electrophoretic apparatus according to the invention.

With such a configuration, it is possible to obtain the electronic equipment with a high performance and reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a detailed description will be given of an electrophoretic particle, a manufacturing method of an electrophoretic particle, electrophoretic dispersed liquid, an electrophoretic sheet, an electrophoretic apparatus, and electronic equipment according to embodiments of the present invention based on preferable embodiments shown in the accompanying drawings.

Electrophoretic Particle

First, a description will be given of an electrophoretic particle of the invention.

Figure 1:
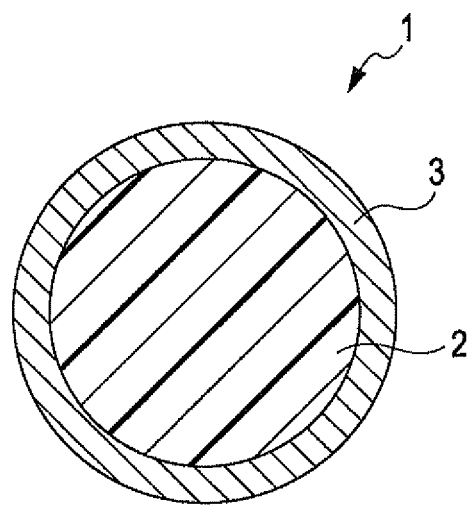
FIG. 1 is a vertical cross-sectional view showing an electrophoretic particle according to an embodiment of the invention.

FIG. 1 is a vertical cross-sectional view showing an embodiment of the electrophoretic particle of the invention, and FIG. 2 is a diagram schematically showing a polymer included in the electrophoretic particle shown in FIG. 1.

An electrophoretic particle 1 includes a mother particle 2 and a covering layer 3 provided on the surface of the mother particle 2.

For the mother particle 2, at least one kind from a pigment particle, a resin particle, and a composite particle thereof is preferably used, for example. These particles can be easily manufactured.

Examples of the pigments configuring the pigment particle include black pigment such as aniline black, carbon black, or titan black, white pigment such as titanium dioxide, antimony trioxide, barium sulfate, zinc sulfide, zinc flower, or silicon dioxide, azo system pigment such as monoazo, disazo, or polyazo, yellow pigment such as isoindolinone, chrome yellow, yellow iron oxide, cadmium yellow, titan yellow, antimony, red pigment such as quinacridone red or chrome vermilion, blue pigment such as phthalocyanine blue, indanthrene blue, iron blue, ultramarine blue, or cobalt blue, green pigment such as phthalocyanine green. One kind or two or more kinds among them can be used in combination.

Examples of the resin material configuring the resin particle include acrylic resin, urethane resin, urea resin, epoxy resin, polystyrene, and polyester, and one kind or two or more kinds among them can be used in combination.

In addition, examples of the composite particle include a particle which has been subjected to coating processing by covering the surface of the pigment particle with the resin material, a particle which has been subjected to coating processing by covering the surface of the resin particle with the pigment, and a particle configured by mixture which has been obtained by mixing the pigment and the resin material at an appropriate composition ratio.

It is possible to obtain a desired color of the electrophoretic particle 1 by appropriately selecting kinds of the pigment particle, the resin particle, and the composite particle used as the mother particle 2.

In addition, it is necessary that the mother particle 2 contain a functional group which can be linked (coupled) to the polymerization initiator 31 containing a polymerization initiation group (hereinafter, also simply referred to as "a polymerization initiator 31") which will be described later. However, there is a case where no functional group is contained depending on the kinds of the pigment particle, the resin particle, and the composite particle. In such a case, functional group introduction processing such as acid treatment, base treatment, UV treatment, ozone treatment, or plasma treatment is performed in advance, and a functional group is introduced to the surface of the mother particle 2. In addition, examples of the functional group include a hydroxyl group.

At least a part of the surface of the mother particle 2 (almost entire surface of the configuration shown in the drawing) is covered with the covering layer 3.

The invention has a configuration including a plurality of polymers 35, each of which includes the polymerization initiator 31 containing the polymerization initiation groups coupled to the surface of the mother particle 2 and the polymerization part 34 at which the monomers are polymerized in living radical polymerization from the polymerization initiation group as a starting point. Furthermore, the polymerization part 34 includes a first polymerization part 32, which is coupled to the polymerization initiator 31, at which first monomers each containing a monomer with a cross-linking group are polymerized in living radical polymerization and a second polymerization part 33, which is coupled to an end of the first polymerization part 32 on the other side to which the polymerization initiator 31 is coupled, at which second monitors with no cross-linking groups are polymerized in living radical polymerization. In addition, the polymers 35 are coupled to each other via cross-linking agent at the cross-linking groups of the first polymerization parts 32.

Figure 2A:
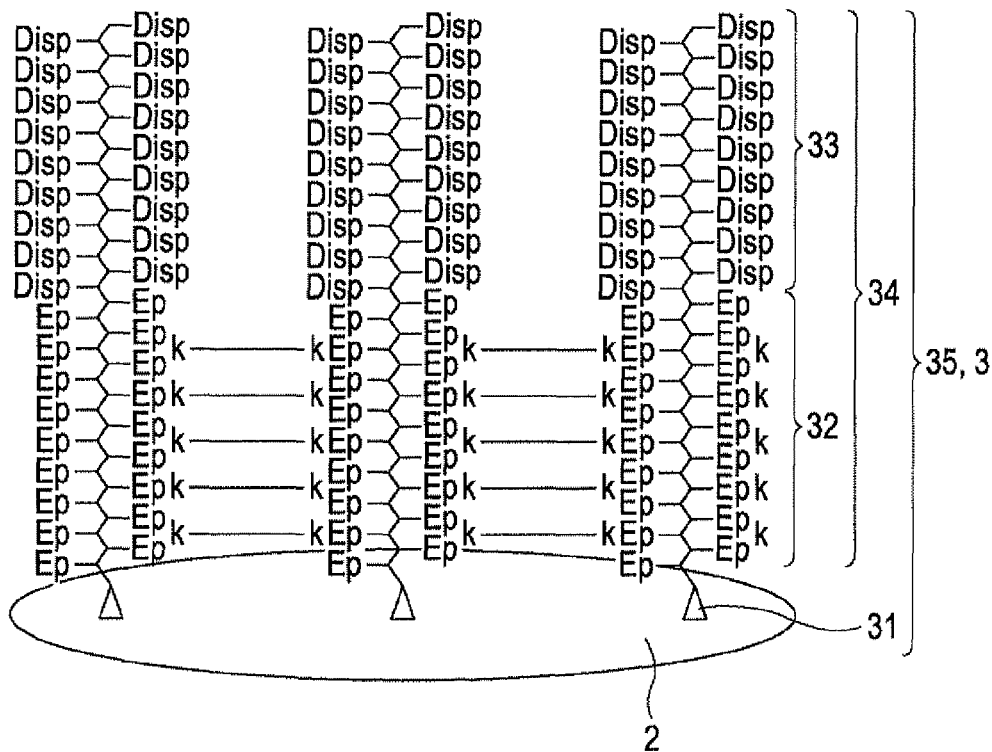
FIGS. 2A and 2B are diagrams schematically showing a polymer included in the electrophoretic particle shown in FIG. 1.

That is, the polymer 35 includes the first polymerization part 32, which is coupled to the polymerization initiator 31, at which the first monomers each containing the monomer with the cross-linking group are polymerized in living radical polymerization, and the second polymerization part 33, which is coupled to the first polymerization part 32, at which the second monomers with no monomer containing a cross-linking group are polymerized in living radical polymerization, and the polymers 35 are coupled to each other via the cross-linking agent at the cross-linking groups of the first polymerization parts 32 (see FIG. 2A).

The polymerization initiator 31 containing the polymerization initiation group is coupled to the surface of the mother particle 2 and coupled to the polymerization part 34 which is polymerized from the polymerization initiation group as a starting point.

That is, the polymerization initiator 31 containing the polymerization initiation group functions as a connecting part for connecting (coupling) the mother particle 2 and the polymerization part 34.

The polymerization initiator 31 is not particularly limited as long as the polymerization initiator 31 has a polymerization initiation group and has a function of being linked to the surface of the mother particle 2. For example, examples thereof include silane coupling agent containing a polymerization initiation group. In the case of the silane coupling agent, the polymerization initiator (silane coupling agent) 31 can be linked to the surface of the mother particle 2 via a linking group such as an alkoxysilyl group contained in the silane coupling agent.

Examples of the polymerization initiation group include a polymerization initiation group which causes polymerization by atom transfer radical polymerization, a polymerization initiation group which causes polymerization by nitroxide-mediated polymerization (NMP), a polymerization initiation group which causes polymerization by reversible addition fragmentation change transfer polymerization (RAFT), a polymerization initiation group which causes polymerization based on living radical polymerization using an organotellurium compound (TERP). Particularly, the polymerization initiation group which causes polymerization by atom transfer radical polymerization is preferable. With the polymerization initiation group, it is possible to simply and efficiently progress the living radical polymerization in which the polymerization initiation group and the monomer are reacted at lower cost with satisfactory controllability.

Examples of the polymerization initiation group which causes polymerization by atom transfer radical polymerization includes polymerization initiation group derived from organohalide or a sulfonyl halide compound. Examples of the polymerization initiation group derived from organohalide include a polymerization initiation group containing benzyl derivative as represented by the following Formula (1), a polymerization initiation group containing α-haloester group as represented by the following Formula (2), and a polymerization initiation group containing α-haloamide group as represented by the following Formula (3). Furthermore, examples of the polymerization initiation group derived from a sulfonyl halide compound include a polymerization initiation group as represented by the following Formula (4).

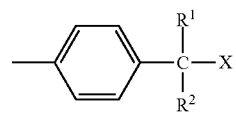

(1)

(In the formula, $R^1$ and $R^2$ independently represent a group from hydrogen, X, and an alkyl group which contains one to twenty carbon atoms, in which arbitrary —$CH_2$— may be substituted with —O— or a cycloalkylene group, where X represents chlorine, bromine, or iodine.)

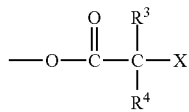

(In the formula, $R^3$ and $R^4$ independently represent hydrogen, an alkyl group which contains one to twenty carbons, an aryl group which contains six to twelve carbons, or an arylalkyl group which contains seven to twenty carbons, and $R^3$ and $R^4$ are not hydrogen at the same time. In addition, X represents chlorine, bromine, or iodine.)

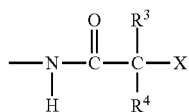

(In the formula, $R^3$ and $R^4$ independently represent hydrogen, an alkyl group which contains one to twenty carbons, an aryl group which contains six to twelve carbons, or an arylalkyl group which contains seven to twenty carbons, and $R^3$ and $R^4$ are not hydrogen at the same time. In addition, X represents chlorine, bromine, or iodine.)

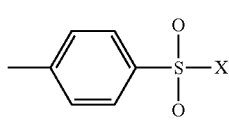

(In the formula, X represents chlorine, bromine, or iodine.)

Accordingly, when silane coupling agent is used as the polymerization initiator, the polymerization initiator 31 can be expressed by the following Formula (5).

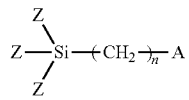

(In the formula, A represents a polymerization initiation group. Each Z represents a linking group and independently represents hydrogen, a methyl group, chlorine, a methoxy group, or an ethoxy group. All the three Z are not hydrogen or methyl groups at the same time. n represents an integer from 1 to 20.)

The polymerization part 34 includes the first polymerization part 32 which is coupled to the polymerization initiator 31 and the second polymerization part 33 which is coupled to the end of the first polymerization part 32 on the opposite side to which the polymerization initiator 31 is coupled.

Hereinafter, a description will be sequentially given of the first polymerization part 32 and the second polymerization part 33.

The first polymerization part 32 is coupled to the polymerization initiator 31, at which the first monomers each containing a monomer with the cross-linking group are polymerized in living radical polymerization. In addition, the cross-linking group is coupled to a cross-linking group included in a first polymerization part 32 of an adjacent polymer (polymer molecule) 35 at one or more locations via the cross-linking agent.

As described above, adjacent polymers 35 which are coupled to the mother particles 2 are configured to be coupled to each other at the cross-linking groups included in the first polymerization parts 32 via the cross-linking agent.

Accordingly, the polymer 35 is not only coupled at the end on the side of the polymerization initiator 31 but also coupled to the adjacent polymer 35. For this reason, it is possible to prevent that the polymer 35, which has been separated from the mother particle 2 from the coupling part, from being separated from the mother particle 2 as a result since the polymer 35 is coupled to other polymer 35 even if the polymer 35 is separated from the mother particle 2 from the coupling part at the end on the side of the polymerization initiator 31. That is, it is possible to enhance adhesion strength of the polymer 35 to the mother particle 2 and to thereby enhance durability of the electrophoretic particle 1.

Accordingly, it is possible to reliably prevent the polymer 35 from being separated from the mother particle 2 even if there is a physical influence of collision between electrophoretic particles 1 resulted from vibration or the like or a chemical influence originated from the solvent in which the electrophoretic particles 1 are dispersed in the course of manufacturing the electrophoretic apparatus or in the process of using the electrophoretic apparatus. For this reason, it is possible to appropriately prevent occurrence of variations in the characteristics such as an electrification property and a dispersion property among the plurality of electrophoretic particles 1 included in the electrophoretic dispersed liquid when the electrophoretic apparatus is manufactured and used, and therefore, the characteristics such as the electrification property and the dispersion property of the electrophoretic particles 1 become stable over a long time.

The first monomer includes a polymerization group which causes polymerization based on living radical polymerization and a cross-linking group which is cross-linked with a cross-linking group included in an adjacent polymer 35 via the cross-linking agent.

Examples of the polymerization group included in the first monomer include a group which includes double linking of carbon-carbon such as a vinyl group, a styryl group, and a (meth)acryloyl group.

In addition, examples of the cross-linking group included in the first monomer include an epoxy group, an isocyanate group, a carboxyl group, and an amino group. Particularly, an epoxy group is preferable. Since an epoxy group has particularly high reactivity among them, it is possible to more reliably cross-link the cross-linking groups via the cross-linking agent.

Examples of the first monomer including an epoxy group as the cross-linking group include glycidyl (meth) acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropylene (meth)acrylate, and allylglycidyleter.

When the first monomer including an epoxy group as the cross-linking group is used, examples of the cross-linking agent include acid anhydride, a polyamine compound, a phenol compound, and a thiol compound, and one kind or two or more kinds among them can be used in combination. By using such a compound as the cross-linking agent, it is possible to form a coupled structure by the reaction with an epoxy group and to thereby reliably couple the cross-linking groups via the cross-linking agent.

Particularly, a polyamine compound is preferable among them. Since a polyamine compound can be easily handled and has high reactivity, it is possible to more reliably couple the cross-linking groups.

Specific examples of the cross-linking agent include chain aliphatic polyamine such as diethylenetriamine, triethylenetetramine, tetraethylenepentamine, dipropylenediamine, and diethylaminopropylamine, cyclic aliphatic polyamine such as N-aminoethylpiperazine, menthenediamine, and isophoronediamine, aliphatic-aromatic amine such as m-xylylenediamine, sho-amine X, amine black, and sho-amine black, aromatic amine such as metaphenylenediamine, diaminodiphenylmethane, and diaminodiphenylsulfone, acid anhydride such as phthalic anhydride, trimellitic anhydride, pyromellitic anhydride, benzophenonetetracarboxylic anhydride, ethylene glycol bis trimellitate, glycerol tris trimellitate, maleic anhydride, tetrahydrophthalic anhydride, succinic anhydride, methylcyclohexene dicarboxylic anhydride, an alkylstyrene-maleic anhydride copolymer, chlorendic anhydride, and polyazelaic anhydride.

In addition, the cross-linking structure formed by the cross-linking groups of the adjacent polymers 35 being coupled to each other via the cross-linking agent is not necessarily formed by the respective first monomers included in the first polymerization part 32, and only one cross-linking structure may be formed in the first polymerization part 32 of each polymer 35.

In addition, the first monomer may be a multifunctional monomer including two or more cross-linking groups instead of a monofunctional monomer including one cross-linking group. Furthermore, at least a part of the plurality of first monomers configuring the first polymerization part 32 may not include cross-linking groups. By using multifunctional monomers or monomers with no cross-linking groups as the first monomers, it is possible to easily set the cross-linking density in the first polymerization part 32 to desired density.

The sum of the thickness of the first polymerization part 32 and the thickness of the polymerization initiator 31 is preferably set to be not less than about 1 nm and not more than about 100 nm, and more preferably set to be not less than about 5 nm and not more than about 20 nm. If the thickness is set to be less than the lower limit value, it is not possible to sufficiently form the cross-linking structures in which the cross-linking groups are coupled to each other via the cross-linking agent, and there is a concern that the adhesion strength of the polymer 35 to the mother particle 2 cannot be sufficiently enhanced. If the thickness is set to be more than the upper limit value, there is a concern that the mobility of the electrophoretic particles 1 in the electrophoretic dispersed liquid deteriorates since the particle size of each electrophoretic particle 1 becomes unnecessarily large and resistance when the electrophoretic particles 1 move in the electrophoretic dispersed liquid increases.

The second polymerization part 33 is coupled to the end of the first polymerization part 32 on the opposite side to which the polymerization initiator is coupled, and second monomers thereof which does not include cross-linking groups are polymerized in living radical polymerization. The second polymerization part 33 is for exhibiting characteristics of the electrophoretic particles 1 in the electrophoretic dispersed liquid, which will be described later.

Although the second monomers do not include monomers which contain cross-linking groups and do not have the cross-linking groups, the second monomers include polymerization groups so as to cause polymerization based on living radical polymerization. The second monomers are classified into non-ionic monomers, cationic monomers, and anionic monomers based on characteristics applied to the electrophoretic particles 1.

Although the polymerization group included in each second monomer is not particularly limited, the same polymerization groups as those included in the first monomer as described above can be exemplified.

By forming the second polymerization part 33 by living radical polymerization by using the second monomers including non-ionic monomers, the second polymerization part 33 exhibits excellent affinity for a dispersion medium included in the electrophoretic dispersed liquid, which will be described later. For this reason, it is possible to disperse the electrophoretic particles 1 each including such a second polymerization part 33 in the electrophoretic dispersed liquid without agglutinating the electrophoretic particles 1.

Examples of such a non-ionic monomer include acrylic monomers such as 1-hexene, 1-heptene, 1-octene, methyl (meth)acrylate, ethyl (meth)acrylate, propyl (meth)acrylate, stearyl (meth)acrylate, lauryl (meth)acrylate, decyl (meth)acrylate, isooctyl (meth)acrylate, isobornyl (meth)acrylate, cyclohexyl (meth)acrylate, and pentafluoro (meth)acrylate, styrene monomers such as styrene, 2-methylstyrene, 3-methylstyrene, 4-methylstyrene, 2-ethylstyrene, 3-ethylstyrene, 4-ethylstyrene, 2-propylstyrene, 3-propylstyrene, 4-propylstyrene, 2-isopropylstyrene, 3-isopropylstyrene, 4-isopropylstyrene, and 4-tert-butylstyrene.

By forming the second polymerization part 33 by living radical polymerization by using the second monomer including cationic monomers, the second polymerization part 33 is positively (plus) charged in the electrophoretic dispersed liquid which will be described later. Therefore, the electrophoretic particle 1 including such a second polymerization part 33 becomes a positively charged electrophoretic particle (positive electrophoretic particle) in the electrophoretic dispersed liquid.

Examples of such a cationic monomer include a monomer which includes an amino group in the structure, and specifically include aminomethyl (meth)acrylate, aminoethyl (meth)acrylate, N,N-dimethylaminoethyl (meth)acrylate, N-ethyl-N-phenylaminoethyl (meth)acrylate, N,N-dimethyl (meth)acrylamide, N,N-diethyl (meth)acrylamide, and 4-vinylpyridine.

By forming the second polymerization part 33 by living radical polymerization by using the second monomers which include anionic monomers, the second polymerization part 33 is negatively (minus) charged in the electrophoretic dispersed liquid which will be described later. Therefore, the electrophoretic particle 1 which includes such a second polymerization part 33 becomes a negatively charged electrophoretic particle (negative electrophoretic particle) in the electrophoretic dispersed liquid.

Examples of such an anionic monomer include a monomer which includes a carboxyl group or a sulfonyl group, and specifically includes (meth)acrylic acid, carboxymethyl (meth)acrylate, carboxyethyl (meth)acrylate, vinylbenzoic acid, vinylphenylacetic acid, vinylphenylpropionic acid, vinylsulfonic acid, sulfomethyl (meth)acrylate, and 2-sulfoethyl (meth)acrylate.

In addition, since the second polymerization part 33 is formed by the polymerization of the aforementioned various second monomers, it is possible to set desired levels of the characteristics, which are originated from the various second monomers, for the second polymerization parts 33 by setting a number of constituents originated from the second monomers.

Figure 2B:
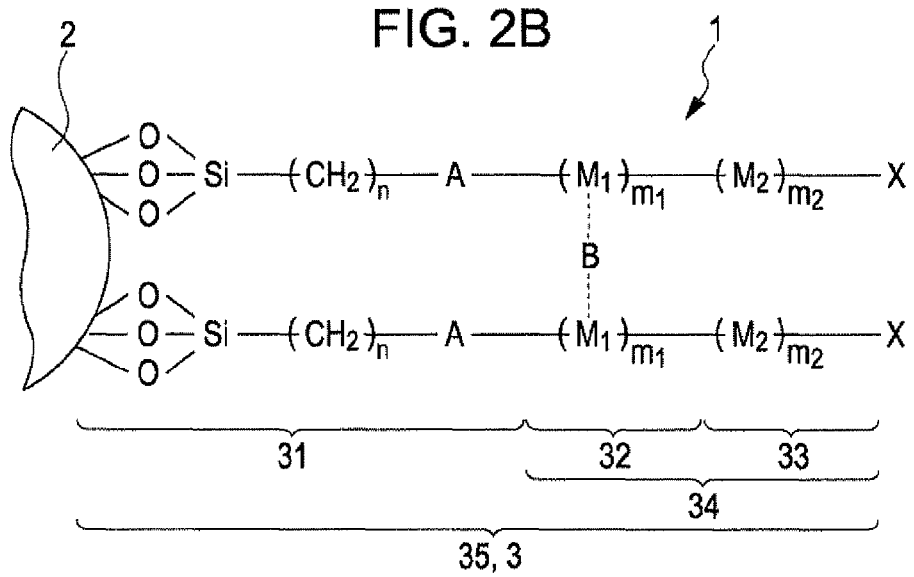

The polymer 35 which can be obtained from the polymerization initiator (silane coupling agent) 31, the first monomers, the second monomers, and the cross-linking agent as described above can be represented by the diagram schematically shown in FIG. 2B, where $M_1$ represents the first monomer, $M_2$ represents the second monomer, and B represents the cross-linking agent. In FIG. 2B, the plurality of first monomers $M_1$ included in the adjacent polymers 35 may be coupled to each other via at least one kind of cross-linking agent B.

In the covering layer 3 as described above, a linkage degree of the polymer 35 to the surface of the mother particle 2 is preferably not less than 0.01 chains/nm$^2$ and not more than 0.5 chains/nm$^2$, and more preferably not less than 0.05 chains/nm$^2$ and not more than 0.1 chains/nm$^2$.

Here, if a configuration in which the polymer 35 is linked to the surface of the mother particle 2 by linking the polymerization initiator 31 including the polymerization initiation group to the surface of the mother particle and then forming the polymerization part 34 from the polymerization initiation group of the polymerization initiator 31 as a starting point is employed, the linkage degree of the polymer 35 to the mother particle 2 generally tends to increase over the above range. That is, the polymer 35 tends to be densely formed with respect to the mother particle 2.

If such electrophoretic particles 1, in each of which the polymer 35 is formed on the surface of the mother particle 2 in a dense state, are dispersed in the electrophoretic dispersed liquid, the dispersion medium cannot easily enter between the polymers depending on the type of the dispersion medium included in the electrophoretic dispersed liquid, which may result in a situation that the electrophoretic particles 1 cannot exhibit a sufficient dispersion ability.

On the other hand, if the linkage degree of the polymer 35 to the surface of the mother particle 2 is set within the above range, the linkage degree of the polymer 35 to the surface of the mother particle 2 is brought into a sparse state, and as a result, the dispersion medium can easily enter between the polymers 35. Therefore, it is possible to provide a sufficient dispersion ability to the electrophoretic particles 1.

Furthermore, since the linkage degree of the polymer 35 is in the sparse state, the respective polymers 35 do not interfere each other and can more easily move. Therefore, it is possible for the polymers including the first polymerization parts 32 originated from the non-ionic monomers to capture such ions with the configuration that the ions are added to the electrophoretic dispersed liquid, and as a result, the electrophoretic particles 1 obtain an electrification property.

In addition, when the electrophoretic particles 1 include polymers 35 which include the first polymerization parts 32 originated from cationic monomers or anionic monomers, counterions are easily separated from the first polymerization parts 32 if the dispersion medium enters between the polymers 35. Therefore, the electrification property of the first polymerization parts 32 is enhanced, and as a result, the electrophoretic particles 1 obtain a more excellent migratory ability.

Furthermore, it is possible to more reliably cross-link the cross-linking groups and to thereby provide both a sufficient dispersion ability and a sufficient migratory ability to the electrophoretic particles 1.

The aforementioned electrophoretic particles 1, in each of which the polymer 35 including the polymerization initiator 31 and the polymerization part 34 configured by the first polymerization parts 32 and the second polymerization parts 33 is formed on the surface of the mother particle 2, can be manufactured as follows, for example.

Manufacturing Method of Electrophoretic Particle

Hereinafter, a description will be given of a manufacturing method of an electrophoretic particle 1.

The manufacturing method of the electrophoretic particle 1 include a first step in which the mother particle 2 is prepared, and a plurality of polymerization initiators 31 containing polymerization initiation groups are linked to the surface of the mother particle 2, and a second process in which the first monomers with cross-linking groups are polymerized in living radical polymerization from the polymerization initiation groups as starting points, the second monomers with no cross-linking groups are then polymerized in living radical polymerization, and the polymerization parts 34, each of which includes the first polymerization part 32 and the second polymerization part 33, are formed by coupling the cross-linking groups via the cross-linking agent to obtain the plurality of polymers 35.

Hereinafter, a detailed description will be given of the respective processes.

[1] First, the mother particle 2 is prepared, and the polymerization initiators 31 containing polymerization initiation groups are linked to the surface of the mother particle 2 (first process).

When the linkage degree of the polymer 35 to the mother particle 2 is set to be not less than 0.01 chains/nm$^2$ and not more than 0.5 chains/nm$^2$, the polymerization initiators 31 are linked to the surface of the mother particle 2 such that the linkage degree of the polymerization initiators 31 to the surface of the mother particle 2 is within the range of not less than 0.01 chains/nm$^2$ and not more than 0.5 chains/nm$^2$.

Here, Methods I to III described below can be exemplified as a method for setting the linkage degree of the polymerization initiators 31 to the surface of the mother particle 2 within the above range, for example.

That is, Method I is a method (dilution method) in which solution containing the polymerization initiators 31 is prepared such that the content of the polymerization initiators 31 in the solution is small and the surface of the mother particle 2 is brought into contact with such solution.

In addition, Method II is a method (competition method) in which solution containing the polymerization initiators 31 with polymerization initiation groups and the polymerization initiators with no polymerization initiation group is prepared and the surface of the mother particle 2 is brought into contact with such solution.

Moreover, Method III is a method (devitalizing method) in which solution containing the polymerization initiators 31 with the polymerization initiation groups is prepared, the surface of the mother particle 2 is brought into contact with such solution, the polymerization initiators 31 with the polymerization initiation groups are linked to the surface of the mother particle 2, and a part of the polymerization initiation groups of the linked polymerization initiators 31 is then devitalized.

Hereinafter, a detailed description will be sequentially given of Methods I to III.

I: Dilution Method

Method I is a method in which solution containing polymerization initiators 31 with the polymerization initiation groups is prepared such that the content of the polymerization initiators 31 with the polymerization initiation groups in the solution is small and the surface of the mother particle 2 is brought into contact with such solution as described above.

By setting the content of the polymerization initiators 31 with the polymerization initiation groups in the solution to be brought into contact with the surface of the mother particle 2 to low density, opportunities that the polymerization initiators 31 with the polymerization initiator groups are in contact with the surface of the mother particle 2 decrease. Therefore, it is possible to bring the linkage degree of the polymerization initiators 31 with the polymerization initiation groups to the surface of the mother particle 2 into the sparse state.

It is possible to set the linkage degree of the polymerization initiators 31 with the polymerization initiation groups to the surface of the mother particle 2 within the above range by setting the content of the polymerization initiators 31 with the polymerization initiation groups in the solution within a range which is obtained based on the following Equation (A).

$$0.01 < \frac{\frac{W_{ini}}{M_W} N_A}{SW_P} < 0.5 \quad (A)$$

(In the equation, $W_{ini}$ represents a weight [g] of the silane coupling agent with the polymerization initiation groups, $M_W$ represents a molecular weight [g/mol] of the silane coupling agent with the polymerization initiation groups, S represents a specific surface area [nm²/g] of the mother particle, $W_P$ represents a weight [g] of the mother particle, and $N_A$ represents an Avogadro number [/mol], respectively.)

For example, when the polymerization initiators 31, which contain the polymerization groups, with a molecular weight of 300 are formed on the mother particle 2 with a specific surface area of 10 nm²/g, a relationship of 0.00005<$W_{ini}$/$W_P$, 0.0025 is obtained from the above Equation (A).

Therefore, it is possible to set the linkage degree of the polymerization initiators 31 with the polymerization initiation groups to the surface of the mother particle 2 within the above range by causing the solution to contain the polymerization initiators 31 with the polymerization initiation groups within a range from 0.005 wt % to 0.25 wt % with respect to the weight of the mother particle 2 in this case.

In addition, examples of a method for bringing the solution into contact with the surface of the mother particle 2 include I: a method (dipping method) in which the mother particle 2 is dipped into the solution, II: a method (coating method) in which the surface of the mother particle 2 is coated with the solution, III: a method (spraying method) in which the solution is supplied to the surface of the mother particle 2 in a shower state, and the like.

In addition examples of solvent for preparing the above solution include non-polar solvent such as hexane, benzene, toluene, diethyl ether, chloroform, ethyl acetate, and methylene chloride, aprotic polar solvent such as tetrahydrofuran, acetone, acetonitrile, N,N-dimethylformamide, and dimethylsulfoxide, and protic polar solvent such as methanol, ethanol, propanol, and butanol. One kind or two or more kinds among them can be used in combination. On this occasion, a small amount of water, acid, or base may be added in order to enhance reactivity of the polymerization initiators (silane coupling agent) 31.

When the dipping method is used, the solution may be irradiated with ultrasonic waves for a predetermined time or stirred for a predetermined time as necessary. In doing so, the dispersion property of the mother particle 2 in the solution is enhanced. Therefore, it is possible to more uniformly link the polymerization initiators 31 with the polymerization initiating groups to the surface of the mother particle 2.

For example, when the dipping method is used, the reaction between the surface of the mother particle 2 and the polymerization initiators with the polymerization initiation groups can be performed by heating the mother particle 2 after removing excessive solution by filtration or the like. In addition, a condition for heating the mother particle 2 is set such that the heating temperature ranges from about 100° C. to about 150° C. and the heating time ranges from about 30 minutes to 90 minutes.

II: Competition Method

Method II is a method in which solution which includes the polymerization initiators 31 with the polymerization initiation groups and the polymerization initiators (silane coupling agent) with no polymerization initiation group is prepared and the surface of the mother particle 2 is brought into contact with such a solution as described above.

With the configuration in which the polymerization initiators 31 with the polymerization initiation groups and further the polymerization initiators (silane coupling agent) with no polymerization initiation group are included in the solution to be brought into contact with the surface of the mother particle 2, both the polymerization initiators 31 with the polymerization initiation group and the polymerization initiators (silane coupling agent) with no polymerization initiation group are linked to the surface of the mother particle 2. As a result, the linkage degree of the polymerization initiators 31 with the polymerization initiation groups to the surface of the mother particle 2 is brought into the sparse state.

The linkage degree of the polymerization initiators 31 with the polymerization initiation groups to the surface of the mother particle 2 can be set within the above range by setting a ratio between the content of the polymerization initiators 31 with the polymerization initiation groups in the solution and the content of the polymerization initiator (silane coupling agent) with no polymerization initiation group within a range which is obtained based on the following Equation (C).

That is, when a molar ratio between the polymerization initiators 31 with the polymerization initiation groups and the polymerization initiators (silane coupling agent) with no polymerization initiation group in the solution is assumed to be m: (1−m), the linkage degree of the polymerization initiators 31 with the polymerization initiation groups to the surface of the mother particle 2, which has been treated using such solution, can be expressed by the following Equation (B).

$$\frac{m}{S_A m + S_B (1 - m)} \quad (B)$$

(In the equation, $S_A$ represents a coating area [nm²] of the polymerization initiators 31 with the polymerization initiation groups, and $S_B$ represents a coating area [nm²] of the polymerization initiators (silane coupling agent) with no polymerization initiation group.)

Since the linkage degree from 0.01 to 0.5 [chains/nm²] is applicable, a relationship of $0.01 S_A < M < 0.5 S_A$ can be obtained based on the following Equation (C).

$$0.01 < \frac{m}{S_A m + S_B (1 - m)} < 0.5 \quad (C)$$

(In the equation, $S_A$ and $S_B$ can be handled such that $S_A = S_B$ are satisfied.)

Accordingly, the coating area $S_A$ of the polymerization initiators 31 with the polymerization initiation groups can be generally handled as 0.2 nm², it is possible to set the linkage degree of the polymerization initiators 31 with the polymerization initiation groups to the surface of the mother particle 2 within the above range by preparing the solution which includes the polymerization initiators 31 with the polymerization initiation groups and the polymerization initiators (silane coupling agent) with no polymerization initiation group so as to satisfy a relationship of 0.002<m<0.1.

In this method, it is preferable that the polymerization initiators 31 with the polymerization initiation groups and the polymerization initiators (silane coupling agent) with no polymerization initiation group be linked over substantially the entire region, in which the polymerization initiators can be linked, on the surface of the mother particle 2. Accordingly, it is preferable that an excessive amount of the mixture of the polymerization initiators 31 with the polymerization initiation groups and the polymerization initiators (silane coupling agent) with no polymerization initiation group be included in the solution to be used in the method. Specifically, the mixture is preferably included at a rate of about 1 wt % to about 5 wt % with respect to the weight of the mother particle 2.

For example, when silane coupling agent is used as the polymerization initiators which do not include the polymerization initiation groups, examples of the polymerization initiators include vinyltrimethoxysilane, vinyltriethoxysilane, vinyltriphenoxysilane, p-styryltrimethoxysilane, p-styryltriethoxysilane, p-styryltriphenoxysilane, 3-acryloxypropyltriphenoxysilane, 3-acryloxypropyltriethoxysilane, 3-acryloxypropyltriphenoxysilane, 3-methacryloxypropyltriphenoxysilane, 3-methacryloxypropyltriethoxysilane, 3-methacryloxypropyltriphenoxysilane, 3-aminopropyltriphenoxysilane, 3-mercaptopropyltriphenoxysilane, 3-mercaptopropyltriethoxysilane, 3-glycidoxypropyltriphenoxysilane, allyltrimethoxysilane, allyltriethoxysilane, allyltriphenoxysilane, methyltrimethoxysilane, dimethyldimethoxysilane, trimethylmethoxysilane, n-propyltriphenoxysilane, n-butyltriethoxysilane, n-hexyltrimethoxysilane, n-hexyltriethoxysilane, n-octyltriethoxysilane, n-decyltrimethoxysilane, phenyltrimethoxysilane, and diphenyldimethoxysilane. One kind or two or more kinds among them can be used in combination.

III: Devitalizing Method

Method III is a method in which solution which includes the polymerization initiators 31 with the polymerization initiation groups is prepared, the surface of the mother particle 2 is brought into contact with such solution, the polymerization initiators 31 with the polymerization initiation groups are linked to the surface of the mother particle 2, and a part of the polymerization initiation groups of the linked polymerization initiators 31 is then devitalized as described above.

Since a part of the polymerization initiation groups include in the polymerization initiators 31 is devitalized (inactivated) among the plurality of polymerization initiators 31 linked to the surface of the mother particle 2, the linkage degree of the polymerization initiation groups to the surface of the mother particle 2 is brought into a sparse state as a result.

In this method, it is preferable that the polymerization initiators 31 with the polymerization initiation groups be linked over substantially the entire region, in which the polymerization initiators can be linked, on the surface of the mother particle 2. Accordingly, it is preferable that an excessive amount of the polymerization initiators 31 with the polymerization initiation groups be included in the solution to be used in such a method. Specifically, the polymerization initiators 31 are preferably included at a rate from about 1 wt % to about 5 wt % with respect to the weight of the mother particle 2.

Although the method of devitalizing the polymerization initiation groups is not particularly limited, examples thereof includes solution treatment in which the mother particle 2, to the surface of which the polymerization initiators 31 with the polymerization initiation groups have been linked, is treated with acid solution or alkaline solution in a state in which the mother particle 2 is dispersed in liquid or in which the mother particle 2 is dried, UV irradiation treatment, corona treatment, ozone treatment, plasma treatment, and electron beam irradiation treatment.

[2] Next, the first monomers with the cross-linking groups are polymerized in living radical polymerization from the polymerization initiation groups included in the polymerization initiators 31 as starting points, the second monomers with no cross-linking group are then polymerized in living radical polymerization, and the polymerization parts 34, each of which include the first polymerization part 32 and the second polymerization part 33, are formed by coupling the cross-linking groups via the cross-linking agent to obtain a plurality of polymers 35 (second process).

[2-1] First, the first monomers with cross-linking groups are polymerized in living radical polymerization from the polymerization initiation groups included in the polymerization initiators 31 as starting points.

The living radical polymerization can be achieved by bringing the solution which contains the first monomers and catalyst into contact with the surface of the mother particle 2 to which the polymerization initiators 31 with the polymerization initiation groups are linked, for example.

As the catalyst, catalyst which can obtain a polymerization initiation group at a propagating end in the process of propagation of the first polymerization part 32 or catalyst with a relatively low Lewis acid level is used. Examples of such catalyst include halide of transition metal such as Cu, Fe, Au, Ag, Hg, Pd, Pt, Co, Mn, Ru, Mo, and Nb, a transition metal complex in which an organic group such as copper phthalocyanine is coordinated as ligand, and the like. Particularly, catalyst which contains halide of transition metal as a main component is preferably used.

Examples of the solvent for preparing the above solution include water, alcohols such as methanol, ethanol, and butanol, hydrocarbons such as hexane, octane, benzene, toluene, and xylene, ethers such as diethyl ether and tetrahydrofran, and halogenated aromatic hydrocarbons such as chlorobenzene and o-dichlorobenzene, and such solvent can be used alone or as mixed solvent.

If the solution is brought into contact with the surface of the mother particle 2 to which the polymerization initiators 31 with the polymerization initiation groups, a polymerization reaction occurs between the polymerization initiation groups and the polymerization groups included in the first monomers. In addition, the propagating end always becomes a polymerization initiation group in the process of the propagation of the first polymerization part 32, the polymerization reaction further occurs between the polymerization initiation group and the polymerization groups of the first monomers, and the first polymerization part 32 is synthesized (generated).

Here, the propagating end always has a polymerization activity in the process of the propagation of the first polymerization part 32 in the living radical polymerization, and therefore, the polymerization reaction further progresses if the first monomers are newly added after the first monomers are consumed and the polymerization reaction is stopped.

Accordingly, it is possible to precisely control the number of constituents originated from the first monomers included in the synthesized polymers 35 as a result of adjusting the amount of the first monomers to be supplied to a reaction system, reaction time, and the amount of catalyst in accordance with a desired degree of polymerization.

In addition, it is possible to obtain the first polymerization part 32 with uniform distribution of the degree of polymerization.

In addition, it is preferable to perform deoxidization treatment on the solution (reaction liquid) before starting the polymerization reaction. Examples of the deoxidization treatment include substitution after vacuum deaeration using inert gas such as argon gas or nitrogen gas and purge treatment.

In addition, it is possible to more rapidly and reliably cause the polymerization reaction of the first monomers by heating (warming) the solution to a predetermined temperature (temperature at which the first monomers and the catalyst are activated) during the polymerization reaction.

Although the heating temperature is slightly different depending on a type of the catalyst and is not particularly limited, the heating temperature preferably ranges from about 30° C. to about 100° C. In addition, the heating time (reaction time) preferably ranges from about 10 hours to about 20 hours if the heating temperature is set within the above range.

[2-2] Next, the cross-linking groups included in the plurality of first polymerization parts 32 which have been coupled to the surface of the mother particle 2 via the polymerization initiators 31 are linked to each other via the cross-linking agent.

In doing so, a cross-linking structure in which the cross-linking groups included in the adjacent first polymerization parts 32 are coupled to each other via the cross-linking agent is formed.

The formation of the cross-linking structure can be achieved by bringing the solution which contains the cross-linking agent into contact with the surface of the mother particle 2 to which the plurality of first polymerization parts 32 are linked via the polymerization initiators 31, for example.

As the solvent for preparing the solution, the same solution as those described in the above process [2-1] can be used.

Furthermore, a ratio A:B between the number A of the cross-linking groups formed in each mother particle 2 and the number B of the reaction parts included in the cross-linking agent preferably ranges from 1:2 to 10:1, and is more preferably 1:1 (equal amounts). Since unreacted cross-linking agent or partially reacted cross-linking agent occurs when an excessive amount of cross-linking agent is added, there is a concern that sufficiently high strength cannot be achieved for the first polymerization part 32. On the other hand, when the cross-linking agent is not sufficient, a large amount of unreacted cross-linking groups remain, and there is a concern that sufficiently high strength cannot be achieved for the first polymerization part 32.

In addition, hardening accelerator is preferably included in the solution which contains the cross-linking agent. In doing so, it is possible to more smoothly form the cross-linking structure.

Although the hardening accelerator is not particularly limited, examples thereof include imidazoles and derivatives thereof, tertiary amines, and quaternary ammonium compounds. One kind or two or more kinds among them can be used in combination.

In addition, it is possible to more rapidly and reliably cause the reaction by heating (warming) the solution to a predetermined temperature (a temperature at which the cross-linking groups and the cross-linking agent are reacted) during the cross-linking reaction.

Although the heating temperature is slightly different depending on types of the cross-linking groups and the cross-linking agent and is not particularly limited, the heating temperature preferably ranges from about 30° C. to about 100° C. In addition, the heating time (reaction time) preferably ranges from about 0.5 hours to about 10 hours if the heating temperature is set within the above range.

There is a case in which unreacted cross-linking groups remain in the first polymerization part 32 after the formation of the cross-linking structure. In such a case, there is a concern that the cross-linking groups unexpectedly react (decomposition reaction, for example) in the subsequent process [2-3] or in the electrophoretic dispersed liquid due to high reactivity of the cross-linking groups (particularly, epoxy groups), and as a result, the characteristics such as the dispersion property and the electrification property of the electrophoretic particle 1 vary. For the purpose of preventing such variations in the characteristics, decomposition treatment of the cross-linking groups may be performed in advance after this process [2-2].

Examples of the decomposition treatment include a method in which the electrophoretic particles 1 are brought into contact with reagent general acid, alkali, and sodium sulfite.

[2-3] Next, the second monomers with no cross-linking groups are polymerized in living radical polymerization at an end of the first polymerization part 32 on the opposite side to which each polymerization initiator 31 is coupled.

The living radical polymerization can be performed by bringing the solution which contains the second monomers and catalyst into contact with the surface of the mother particle 2 to which the plurality of first polymerization parts 32 are linked via the polymerization initiators 31.

As catalyst and solvent for preparing the above solution, the same catalyst and solvent as those described in the above process [2-1] can be used.

If the solution is brought into contact with the surface of the mother particle 2 to which the plurality of first polymerization parts 32 are linked via the polymerization initiators 31, a polymerization reaction occurs between the polymerization initiation groups and the polymerization groups included in the second monomers after the formation of the first polymerization parts 32 since the polymerization initiation groups remain at the propagating ends. Furthermore, the propagating end always becomes a polymerization initiation group in the process of propagation of the second polymerization part 33 in the same manner as in the process of propagation of the first polymerization part 32, the polymerization reaction further occurs between the polymerization initiation group and the polymerization groups of the second monomers, and the second polymerization part 33 is synthesized (generated).

Here, the propagating end always has a polymerization activity in the process of the propagation of the second polymerization part 33 in the living radical polymerization, and therefore, the polymerization reaction further progresses if the second monomers are newly added after the second monomers are consumed and the polymerization reaction is stopped.

Accordingly, it is possible to precisely control the number of constituents originated from the second monomers included in the synthesized polymers 35 as a result of adjusting the amount of the second monomers to be supplied to a reaction system, reaction time, and the amount of catalyst in accordance with a desired degree of polymerization.

In addition, it is possible to obtain the second polymerization part 33 (polymer 35) with uniform distribution of the degree of polymerization.

As described above, it is possible to for, the polymers 35 which include the second polymerization parts 33 with a desired degree of polymerization in a simple process while suppressing variations in the respective electrophoretic particles 1. As a result, the electrophoretic particles 1 obtain excellent dispersion ability and migratory ability in the electrophoretic liquid which will be described later.

In addition, it is preferable to perform deoxidization treatment on the solution (reaction liquid) before starting the polymerization reaction in the same manner as in the process [2-1].

In addition, it is possible to more rapidly and reliably cause the polymerization reaction of the monomers by heating (warming) the solution to a predetermined temperature (temperature at which the monomers and the catalyst are activated) during the polymerization reaction in the same manner as in the process [2-1].

When the linkage degree of the polymerization initiators 31 with the polymerization initiation groups to the surface of the mother particle 2 is set to be not less than 0.01 chains/nm$^2$ and not more than 0.5 chains/nm$^2$ in the process [1], it is similarly possible to set the linkage degree of the polymers 35 formed in this process [2] to the surface of the mother particle 2 to be not less than 0.01 chains/nm$^2$ and not more than 0.5 chains/nm$^2$.

The electrophoretic particle 1 in which the mother particle 2 is covered with the covering layer 3 is manufactured as described above.

Although the above description was given of the embodiment in which the cross-linking groups included in the plurality of first polymerization parts 32 are linked to each other via the cross-linking agent in the process [2-2] after the formation of the first polymerization parts 32 in the process [2-1], the invention is not limited to such a case. For example, the cross-linking groups may be linked to each other via the cross-linking agent after the formation of the second polymerization parts 33 in the process [2-3]. However, it is possible to easily cause the cross-linking agent to reach the first polymerization parts 32 positioned on the side of the mother particle 2 with the configuration in which the process [2-2] is performed prior to the process [2-3] as described above. Therefore, it is possible to more reliably couple the cross-linking groups included in the plurality of first polymerization parts 32 via the cross-linking agent.

Electrophoretic Dispersed Liquid

Next, a description will be given of electrophoretic dispersed liquid of the invention.

In the electrophoretic dispersed liquid, at least one kind of electrophoretic particles (the electrophoretic particles of the invention) are dispersed (suspended) in a dispersion medium (liquid phase dispersion medium).

A dispersion medium which has a relatively high insulation property is preferably used. Examples of the dispersion medium include, various kinds of water, alcohols, cellosolves, esters, aliphatic hydrocarbons (liquid paraffin), alicyclic hydrocarbons, aromatic hydrocarbons, halogenated hydrocarbon, and aromatic heterocyclic compounds. They can be used as single solvent or mixed solvent.

Various additives such as electrolyte, (anionic or cationic) surfactant, charge control agent configured by particles of metal soap, a resin material, a rubber material, oils, varnish, or a compound, lubricant, stabilizing agent, and various dyes may be added to the dispersion medium as necessary.

In addition, the dispersion of the electrophoretic particles in the dispersion medium can be performed by one kind or in combination of two or more kinds from a paint shaker method, a ball mill method, a medium mill method, an ultrasonic dispersion method, a stirring dispersion method and the like, for example.

The electrophoretic particle 1 exhibits both the excellent dispersion ability and the excellent migratory ability in the electrophoretic dispersed liquid as described above due to the operation of the polymers 35 included in the covering layer 3.

Electrophoretic Display Apparatus

Next, a description will be given of an electrophoretic display apparatus to which an electrophoretic sheet of the invention is applied (the electrophoretic apparatus of the invention).

Figure 3:
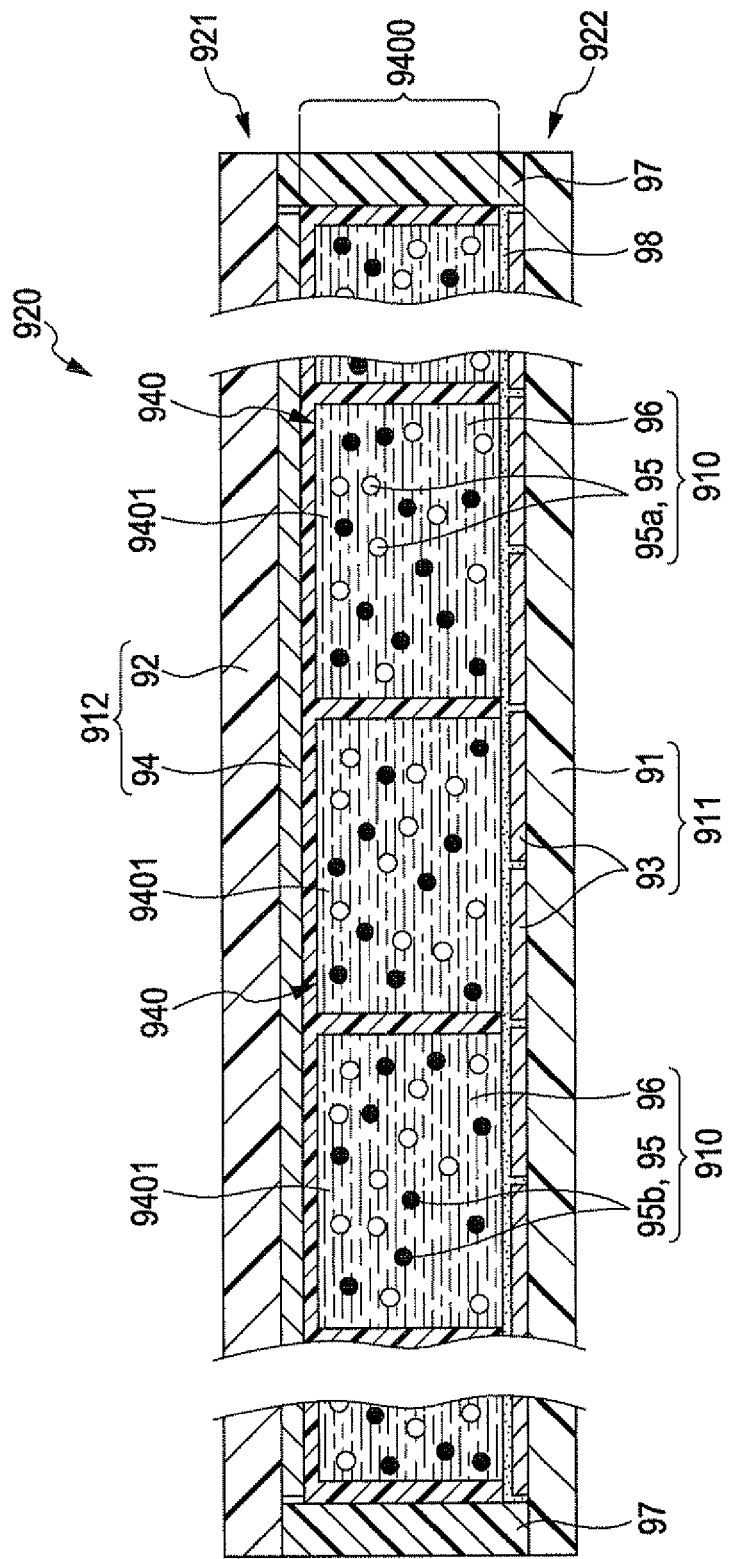
FIG. 3 is a diagram schematically showing a vertical cross-sectional view of an electrophoretic display apparatus according to an embodiment.
Figure 4A:
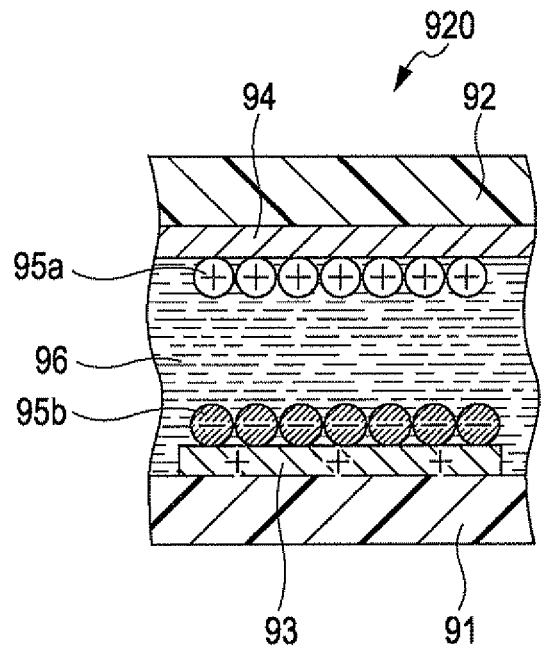
FIGS. 4A and 4B are diagrams schematically showing an operation principle of the electrophoretic display apparatus shown in FIG. 3.
Figure 4B:
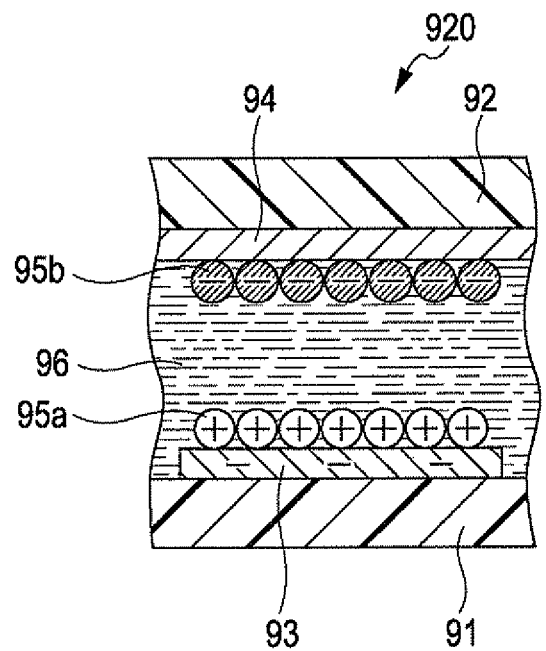

FIG. 3 is a diagram schematically showing a vertical cross-sectional view of an embodiment of the electrophoretic display apparatus, and FIGS. 4A and 4B are diagrams schematically showing an operation principle of the electrophoretic display apparatus shown in FIG. 3. Hereinafter, the upper side and the lower side in FIGS. 3 and 4A and 4B will be referred to as an "upper side" and a "lower side", respectively, for the purpose of convenience for explanation.

An electrophoretic display apparatus 920 shown in FIG. 3 includes an electrophoretic display sheet (front plane) 921, a circuit substrate (back plane) 922, an adhesive layer 98 which bonds the electrophoretic display sheet 921 and the circuit substrate 922, and a sealing portion 97 which seals a gap between the electrophoretic display sheet 921 and the circuit substrate 922 in an air-tight manner.

The electrophoretic display sheet (the electrophoretic sheet of the invention) 921 includes a substrate 912 which includes a plate-shaped base portion 92 and a second electrode 94 provided on the lower surface of the base portion 92, and a display layer 9400 which is provided on a side of the lower surface (one surface) of the substrate 912 and includes a dividing wall 940 formed into a matrix shape and an electrophoretic dispersed liquid 910.

On the other hand, the circuit substrate 922 includes a facing substrate 911 which includes a plate-shaped base portion 91 and a plurality of first electrodes 93 provided on the upper surface of the base portion 91, and a circuit (not shown) which is provided on the facing substrate 911 (base portion 91) and includes a switching element such as a TFT.

Hereinafter, a description will be sequentially given of configurations of the respective parts.

The base portion 91 and the base portion 92 are respectively configured by sheet-shaped (plate-shaped) members and have a function of supporting and protecting the respective members disposed therebetween.

Although each of the base portions 91 and 92 may have plasticity or rigidity, the base portions 91 and 92 preferably have plasticity. By using the base portions 91 and 92 with plasticity, it is possible to obtain an electrophoretic display apparatus 920 with plasticity, namely a useful electrophoretic display apparatus 920 for constructing an electronic paper, for example.

When each of the base portions (base layers) 91 and 92 is made to have plasticity, it is preferable to respectively configure the base portions 91 and 92 by a resin material.

An average thickness of such base portions 91 and 92 is appropriately set depending on the construction material, use purpose, and the like, and is not particularly limited. However, the average thickness preferably ranges from about 20 μm to about 500 μm, and more preferably ranges from about 25 μm to about 250 μm.

On the surfaces of the base portions 91 and 92 on the side of the dividing wall 940, namely on the upper surface of the base portion 91 and the lower surface of the base portion 92, layer-shaped (film-shaped) first electrodes 93 and second electrode 94 are provided, respectively.

If voltage is applied between the first electrodes 93 and the second electrode 94, an electric field is generated therebetween, and the electric field acts on electrophoretic particles (the electrophoretic particles of the invention) 95.

In this embodiment, the second electrode 94 is used as a common electrode, and the first electrodes 93 are individual electrodes (pixel electrodes connected to a switching element) which has been divided into a matrix shape (line-column shape). A part at which the second electrode 94 and one of the first electrodes 93 configures one pixel.

The constructing materials of the respective electrodes 93 and 94 are not particular limited as long as the construction materials substantially have conductivity.

An average thickness of such electrodes 93 and 94 is appropriately set depending on the construction materials, the use purpose, and the like, and is not particularly limited. However, the average thickness preferably ranges from about 0.05 µm to about 10 µm, and more preferably ranges from about 0.05 µm to about 5 µm.

In addition, the base portion and the electrode which are arranged on the side of the display surface among the base portions 91 and 92 and the electrodes 93 and 94 (the base portion 92 and the second electrode 94 in this embodiment) respectively have light permeability, that is, the base portion and the electrode are substantially transparent (colorless and transparent, colored and transparent, or translucent).

The display layer 9400 is provided so as to be in contact with the lower surface of the second electrode 94 on the electrophoretic display sheet 921.

The display layer 9400 is configured such that the electrophoretic dispersed liquid (the aforementioned electrophoretic dispersed liquid of the invention) 910 is accommodated (sealed) within a plurality of pixel spaces 9401 sectioned by the dividing wall 940.

The dividing wall 940 is formed so as to divide the gap between the facing substrate 911 and the substrate 912 in a matrix shape.

Examples of the construction material of the dividing wall 940 include various resin materials which include thermoplastic resin such as acrylic resin, urethane resin, and olefin resin, and thermohardening resin such as epoxy resin, melamine resin, and phenol resin, and one kind or two or more kinds among them can be used in combination.

The electrophoretic dispersed liquid 910 accommodated in the pixel spaces 9401 is obtained by dispersing (suspending) two kinds of particles, namely colored particles 95b and white particles 95a (at least one kind of electrophoretic particles 1) in the dispersion medium 96 in this embodiment, and the aforementioned electrophoretic dispersed liquid of the invention is applied.

According to such an electrophoretic display apparatus 920, the colored particles 95b and the white particles 95a (electrophoretic particles 1) are electrophoresed toward one of the electrodes based on an electric field generated between the first electrodes 93 and the second electrode 94 if voltage is applied therebetween.

According to this embodiment, positively charged particles are used as the white particles 95a, and negatively charged particles are used as the colored particles (black particles) 95b. That is, the electrophoretic particles 1 with positively charged mother particles 2 are used as the white particles 95a, and the electrophoretic particles 1 with negatively charged mother particles 2 are used as the colored particles 95b.

When such electrophoretic particles 1 are used, the white particles 95a move to the side of the second electrode 94 and are collected in the second electrode 94 as shown in FIG. 4A if the first electrodes 93 have positive potential. On the other hand, the colored particles 95b move to the side of the first electrode 93 and are collected in the first electrodes 93. Therefore, the color of the white particles 95a, namely a white color appears when the electrophoretic display apparatus 920 is viewed from the upper side (the side of the display surface).

In contrast, the white particles 95a move to the side of the first electrodes 93 and are collected in the first electrodes 93 as shown in FIG. 4B when the first electrodes 93 have negative potential. On the other hand, the colored particles 95b move to the side of the second electrode 94 and are collected in the second electrode 94. Therefore, the color of the colored particles 95b, namely a black color appears when the electrophoretic display apparatus 920 is viewed from the upper side (the side of the display surface).

With such a configuration, desired information (image) is displayed on the side of the display surface of the electrophoretic display apparatus 920 in accordance with a color combination of the white particles 95a and the colored particles 95b, the number of particles collected in the electrodes 93 and 94, and the like by appropriately setting the charge amounts of the white particles 95a and the colored particles 95b (electrophoretic particles 1), polarities of the electrodes 93 and 94, a potential difference between the electrodes 93 and 94, and the like.

In addition, a specific gravity of the electrophoretic particles 1 is preferably set to be substantially equal to a specific gravity of the dispersion medium 96. In doing so, the electrophoretic particles 1 can stay at constant positions in the dispersion medium 96 for a long time even after the voltage application between the electrodes 93 and 94 is stopped. That is, the information displayed on the electrophoretic display apparatus 920 is maintained for a long time.

In addition, an average particle size of the electrophoretic particles 1 preferably ranges from about 0.1 µm to about 10 µm, and more preferably ranges from about 0.1 µm to about 7.5 µm. By setting the average particle size of the electrophoretic particles 1 within the above range, it is possible to reliably prevent the electrophoretic particles 1 from agglutinating or settling in the dispersion medium 96, and as a result, it is possible to preferably prevent display quality of the electrophoretic display apparatus 920 from deteriorating.

According to this embodiment, the electrophoretic display sheet 921 and the circuit substrate 922 are bonded to each other via the adhesive layer 98. In doing so, it is possible to more reliably fix the electrophoretic display sheet 921 and the circuit substrate 922.

Although an average thickness of the adhesive layer 98 is not particularly limited, the average thickness thereof preferably ranges from about 1 µm to about 30 µm, and more preferably ranges from about 5 µm to about 20 µm.

The sealing portion 97 is provided between the base portion 91 and the base portion 92 along edge portions thereof. The sealing portion 97 seals the respective electrodes 93 and 94, the display layer 9400, and the adhesive layer 98 in the air-tight manner. In doing so, it is possible to prevent moisture from entering the electrophoretic display apparatus 920 and to thereby more reliably prevent the display performance of the electrophoretic display apparatus 920 from deteriorating.

As a construction material of the sealing portion 97, the same materials as the aforementioned materials exemplified as the construction material of the dividing wall 940 can be used.

Electronic Equipment

Next, a description will be given of electronic equipment of the invention.

The electronic equipment of the invention is provided with the aforementioned electrophoretic display apparatus 920.

Electronic Paper

First, a description will be given of an embodiment in which the electronic equipment of the invention is applied to an electronic paper.

Figure 5:
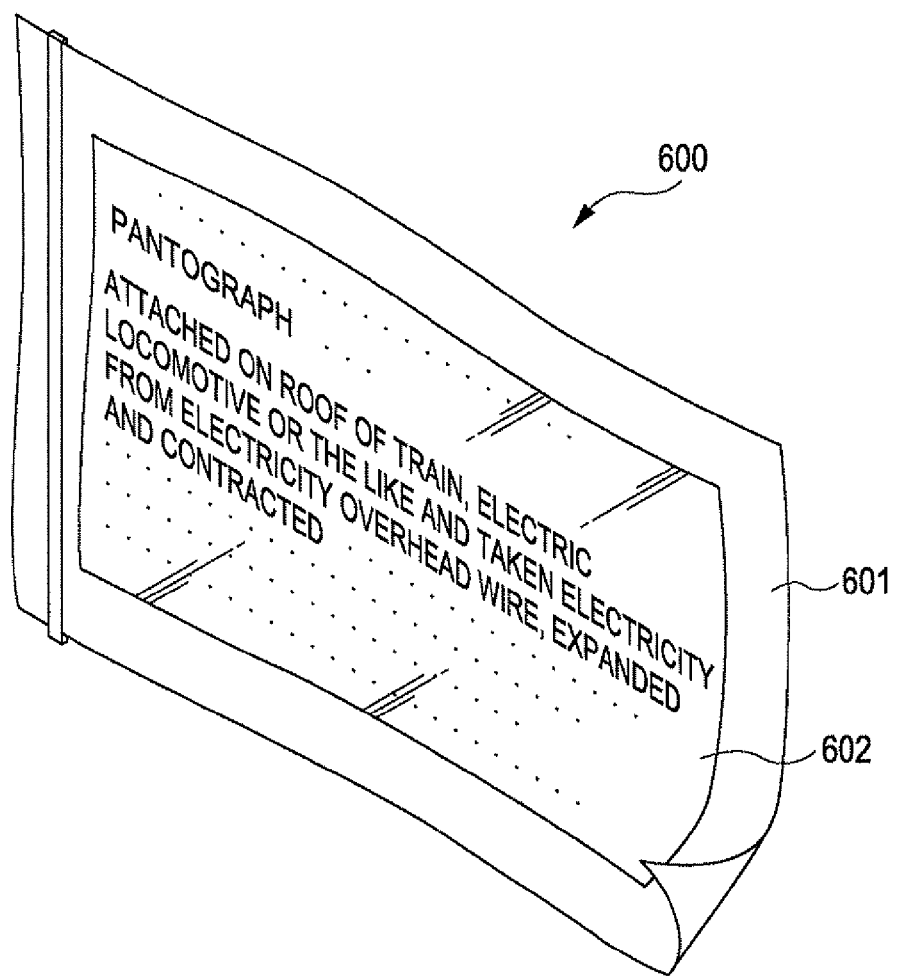
FIG. 5 is a perspective view showing a case where electronic equipment according to an embodiment of the invention is applied to an electronic paper.

FIG. 5 is a perspective view showing a case in which the electronic equipment according to an embodiment of the invention is applied to an electronic paper.

An electronic paper 600 shown in FIG. 5 includes a main body 601 which is configured by a rewritable sheet with same texture and flexibility as those of paper and a display unit 602.

In such an electronic paper 600, the display unit 602 is configured by the aforementioned electrophoretic display apparatus 920.

Display

Next, a description will be given of an embodiment in which the electronic equipment of the invention is applied to a display.

Figure 6A:
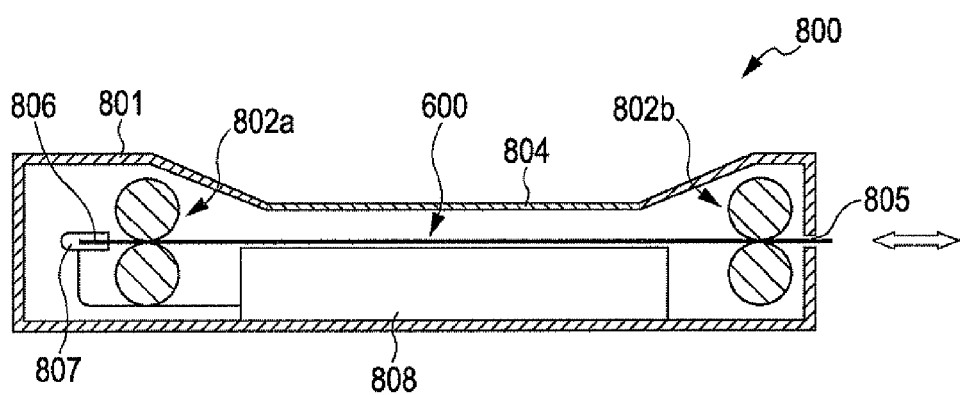
FIGS. 6A and 6B are diagrams showing a case where the electronic equipment according to an embodiment of the invention is applied to a display.
Figure 6B:
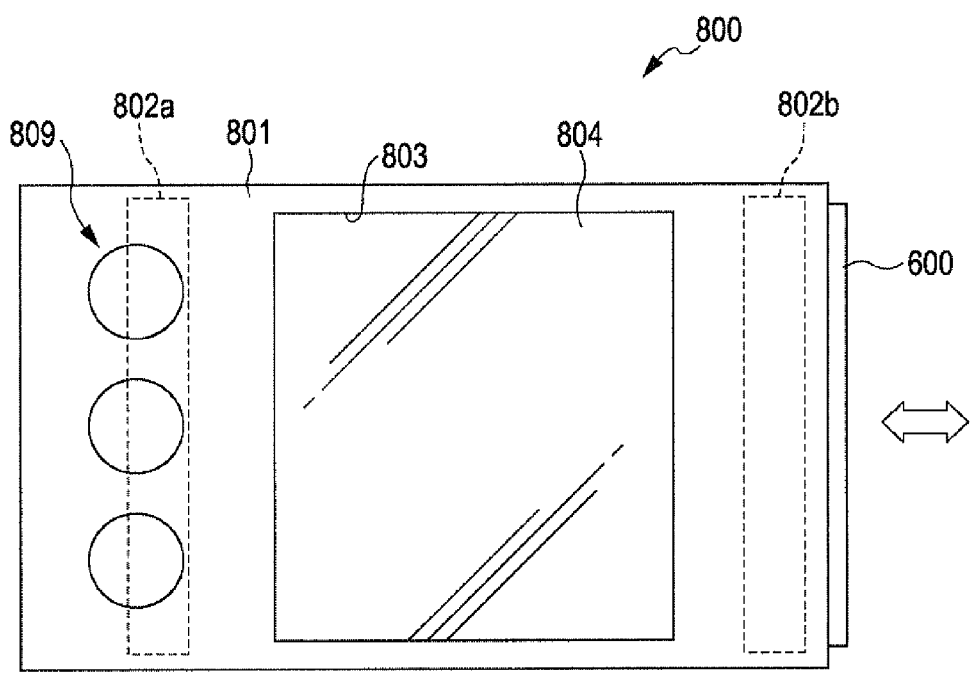

FIGS. 6A and 6B are diagrams showing an embodiment in which the electronic equipment of the invention is applied to a display. In the drawings, FIG. 6A shows a cross-sectional view, and FIG. 6B shows a planer view.

A display (display apparatus) 800 shown in FIGS. 6A and 6B includes a main body 801 and an electronic paper 600 which is detachably provided in the main body 801.

A insertion port 805 into which the electronic paper 600 can be inserted is formed on a side part (the right side in FIG. 6A) of the main body 801, and two pairs of transport rollers 802a and 802b are provided inside the main body 801. If the electronic paper 600 is inserted into the main body 801 via the insertion portion 805, the electronic paper 600 is arranged in the main body 801 in a state where the electronic paper 600 is pinched between the pairs of transport rollers 802a and 802b.

In addition, a rectangular hole 803 is formed on the side of the display surface (the front of the drawing in FIG. 68) of the main body 801, and a transparent glass plate 804 is embedded in the hole 803. In doing so, it is possible to visually recognize the electronic paper 600 in a state where the electronic paper is arranged in the main body 801 from the outside of the main body 801. That is, the display surface of the display 800 is configured by allowing the electronic paper 600 in the state where the electronic paper 600 is arranged in the main body 801 to be visually recognized through the transparent glass plate 804.

In addition, a terminal 806 is provided at a leading end of the electronic paper 600 in the insertion direction (the left side in FIGS. 6A and 6B), and a socket 807 to which the terminal 806 is connected in the state where the electronic paper 600 is arranged in the main body 801 is provided inside the main body 801. A controller 808 and an operation unit 809 are electrically connected to the socket 807.

According to such a display 800, the electronic paper 600 is detachably arranged in the main body 801 and can be carried and used in a state where the electronic paper 600 is removed from the main body 801.

In addition, according to such a display 800, the electronic paper 600 is configured by the aforementioned electrophoretic display apparatus 920.

The electronic equipment of the invention is not limited to the above application, and can be applied to a television, a viewfinder type or monitor-direct-view type video tape recorder, a car navigation apparatus, a pager, a personal digital assistance, an electronic calculator, an electronic newspaper, a word processor, a personal computer, a work station, a video phone, a POS terminal, and a device with a touch panel, for example. It is possible to apply the electrophoretic display apparatus 920 to the display unit of such various kinds of electronic equipment.

Although the above description was given of the electrophoretic particle, the manufacturing method of the electrophoretic particle, the electrophoretic dispersed liquid, the electrophoretic sheet, the electrophoretic apparatus, and the electronic equipment of the invention based on the embodiments shown in the drawings, the present invention is not limited thereto, and configurations of the respective parts can be replaced with arbitrary configurations with the same functions. In addition, other arbitrary constituents may be added to the present invention.

Moreover, one process or two or more processes for an arbitrary purpose may be added to the manufacturing method of the electrophoretic particle of the invention.

EXAMPLES

Next, a description will be given of specific examples of the present invention.

1. Manufacturing of Electrophoretic Particles

Example 1

<1> First, titanium oxide particles ("KR-310" manufactured by Titan Kogyo Ltd.) were prepared as the mother particles.

<2> Next, tetrahydrofuran solvent, a compound represented by the following Formula (6) (silane coupling agent including polymerization initiation groups), and the mother particles were poured into a container formed of stainless steel to obtain mixed liquid, and stirred and mixed for three hours. Then, only titanium oxide particles were extracted by centrifugal separation, and the resulting object was fired for two hours in a drying furnace at 120° C. to link the silane coupling agent including the polymerization initiation groups to the surface of the mother particles.

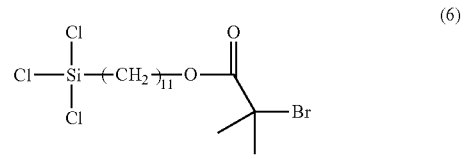

(6)

<3> Next, the tetrahydrofuran solvent, the mother particles, and 20 wt % of glycidyl methacrylate as the first monomers were poured into the mixed liquid in the container formed of stainless steel. Then, nitrogen substitution of the reaction system was sufficiently performed, and an ATRP reaction was then started by adding copper bromide and 2,2'-bipyridyl as polymerization catalyst. In order to enhance reaction controllability, the temperature during the reaction was adjusted between 60° C. and 80° C. The progress and the completion of the reaction were checked by taking a sampling at a predetermined cycle. After the temperature in the system was recovered to the room temperature, the mother particles were washed with the solvent to remove unreacted residual monomers and polymerization catalyst, and the resulting object was dried for two hours in the drying furnace at 80° C. to form the first polymerization parts.

<4> The above particles and 5 wt % of propylene diamine as the cross-linking agent were poured into toluene solution, the mixture was sufficiently stirred and mixed while heated to 60° C., and the cross-linking groups (glycidyl groups) included in the plurality of first polymerization parts were linked to each other via the cross-linking agent. In FT-IR analysis after the reaction, it was confirmed that a peak originated from the epoxy group disappeared and the cross-linking reaction progressed as intended.

<5> Next, 1 wt % of methacroylcholine chloride as cationic monomers and 5 wt % of lauryl methacrylate as non-ionic monomers were poured into tetrahydrofuran solvent, and the second polymerization parts to be linked to the first polymerization parts were then formed by using the ATRP method in the same manner as above.

By the above process, electrophoretic particles in Example 1 in which the covering layers were formed on the mother particles were manufactured.

In addition, the linkage degree of the silane coupling agent with the polymerization initiation groups to be linked to the surfaces of the mother particles in the electrophoretic particles in Example 1 was 0.032 chains/nm$^2$ as a result of calculation from a weight of adhesion of the silane coupling agent which was obtained by a TGA (thermogravimetric measurement) and a specific surface area which was obtained by a BET method.

Examples 2 to 5

Electrophoretic particles in Examples 2 to 5 were manufactured in the same manner as in Example 1 other than that the content of the silane coupling agent including the polymerization initiation groups in the mixed liquid was appropriately set to change the linkage degree of the silane coupling agent with the polymerization initiation groups to be linked to the surface of the mother particles as shown in Table 1 in the process <2>.

Comparative Example 1

Electrophoretic particles in Comparative Example 1 in which the first polymerization parts were not included were manufactured in the same manner as in Example 1 other than that the processes <3> and <4> were omitted.

Comparative Example 2

Electrophoretic particles in Comparative Example 2 in which the cross-linking of the first polymerization parts via the cross-linking agent was omitted were manufactured in the same manner as in Example 1 other than that the process <4> was omitted.

2. Preparation of Electrophoretic Dispersed Liquid

As the dispersion medium, ISOPAR G (manufactured by Exon Chemical Co., Ltd.) was prepared, and 10 wt % of the electrophoretic particles in the respective Examples and Comparative Examples were added to the dispersion medium, and electrophoretic dispersed liquid of the respective Examples and Comparative Examples were prepared.

3. Evaluation

Figure 7:
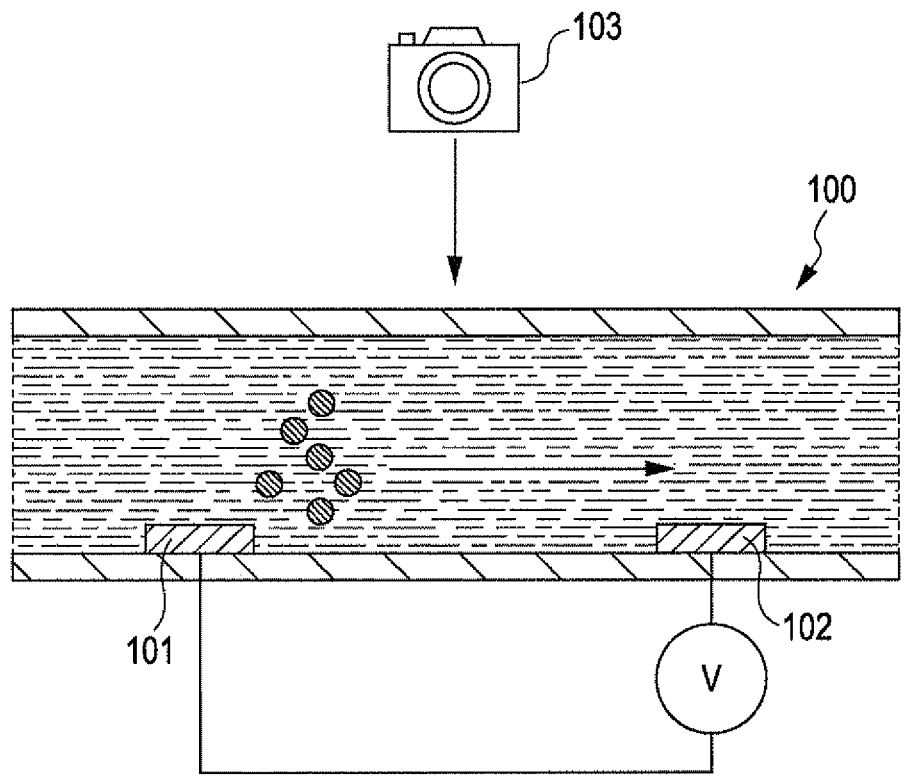
FIG. 7 is a diagram schematically showing a configuration of a sealing cell which is used for measuring electrophoretic mobility of the electrophoretic particle in electrophoretic dispersed liquid.

[1] First, a sealing cell 100 in which parallel plate electrodes 101 and 102 were formed as shown in FIG. 7 was filled with the electrophoretic dispersed liquid of the respective Examples and Comparative Examples, respectively.

[2] Next, the electrophoretic particles are electrophoresed by applying voltage between the electrodes 101 and 102, the state was observed by a high-speed camera 103, and the traveling speed of the electrophoretic particles was calculated. Thereafter, the electrophoretic mobility was calculated by conversion at the intensity of an applied electric field.

[3] Next, 10 mL of the electrophoretic dispersed liquid of the respective Examples and Comparative Examples was sealed in a conical tube with a volume of 15 mL. Thereafter, vibration by ultrasonic waves was applied to the conical tube.

Conditions of Vibration Applied to Conical Tube
Treatment Time: 60 minutes
Cycle of Vibration: 42 kHz

[4] Next, the sealing cell 100 was filled with the electrophoretic dispersed liquid of the respective Examples and Comparative Examples after the application of vibration, respectively, in the same manner as in the processes [1] and [2], and the electrophoretic mobility thereof was calculated.

The result will be shown in Table 1.

TABLE 1

|  | Linkage Degree of Silane Coupling Agent [chains/nm$^2$] | Electrophoretic Mobility × 10$^{-5}$ [cm$^2$/Vs] | |
| --- | --- | --- | --- |
|  |  | Before Application of Vibration | After Application of Vibration |
| Example 1 | 0.032 | 9.2 | 9.1 |
| Example 2 | 0.050 | 7.6 | 7.6 |
| Example 3 | 0.080 | 5.2 | 5.1 |
| Example 4 | 0.100 | 4.1 | 4.1 |
| Example 5 | 0.300 | 2.4 | 2.2 |
| Comparative Example 1 | 0.032 | 8.9 | 2.3 |
| Comparative Example 2 | 0.032 | 9.0 | 1.7 |

As can be clearly understood from Table 1, the electrophoretic mobility of the electrophoretic particles was not significantly different before and after the application of vibration to the electrophoretic dispersed liquid in the electrophoretic display apparatuses in the respective Examples.

On the other hand, the electrophoretic mobility of the electrophoretic particles was lowered after the application of vibration to the electrophoretic dispersed liquid in the electrophoretic display apparatus of the respective Comparative Examples. It was confirmed that disconnected polymer chains were present in supernatant liquid of the dispersed liquid after the ultrasonic wave treatment based on the FT-IR analysis and the NMR analysis on the samples in Comparative Examples 1 and 2. On the other hand, nothing was detected in supernatant liquid in Examples 1 to 5.

Accordingly, it was considered that the adhesion strength of the polymers in the electrophoretic particles was enhanced by forming the cross-linking structure in which the cross-linking groups of the first polymerization parts were cross-linked via the cross-linking agent.

Furthermore, the electrophoretic mobility of $4.1 \times 10^{-5}$ [cm$^2$/Vs] or more was achieved by setting the linkage degree of the silane coupling agent with the polymerization initiation groups within an appropriate range, and as a result, an excellent migratory ability was exhibited in Examples 2 to 4.

The entire disclosure of Japanese Patent Application No. 2012-088855, filed Apr. 9, 2012 is expressly incorporated by reference herein.

What is claimed is:

1. An electrophoretic particle comprising:
a mother particle; and
a covering layer which covers at least a part of the mother particle,
wherein the covering layer includes a plurality of polymers, each of the polymers including a polymerization initiator which includes a polymerization initiation group linked to a surface of the mother particle and polymerization parts in which monomers are polymerized in living radical polymerization from the polymerization initiation group as a starting point, and
wherein each of the polymers includes the polymerization initiator, a first polymerization part, which is coupled to the polymerization initiator, in which first monomers that include monomers with cross-linking groups are polymerized in living radical polymerization, and a second polymerization part, which is coupled to the first polymerization part, in which second monomers that does not include monomers with cross-inking groups are polymerized in living radical polymerization, and the polymers are linked to each other at the cross-linking groups of the first polymerization parts via cross-linking agent.

2. The electrophoretic particle according to claim 1, wherein the first monomers include monomers containing epoxy groups as the cross-linking groups.

3. The electrophoretic particle according to claim 1, wherein the second monomers include non-ionic monomers.

4. The electrophoretic particle according to claim 1, wherein the second monomers include cationic monomers.

5. The electrophoretic particle according to claim 1, wherein the second monomers include anionic monomers.

6. The electrophoretic particle according to claim 1, wherein the polymerization initiator is silane coupling agent.

7. The electrophoretic particle according to claim 1, wherein the polymerization initiation group is polymerized in atom transfer radical polymerization.

8. The electrophoretic particle according to claim 1, wherein a linkage degree of the polymers to the surface of the mother particle is not less than 0.01 chains/nm$^2$ and not more than 0.5 chains/nm$^2$.

9. A manufacturing method of an electrophoretic particle which includes a mother particle and a covering layer which covers at least a part of the mother particle, the method comprising:
preparing the mother particle and linking a plurality of polymerization initiators with polymerization initiation groups to a surface of the mother particle in a first process; and
polymerizing first monomers with cross-linking groups in living radical polymerization from the polymerization initiation groups as starting points, then polymerizing second monomers with no cross-linking groups in living radical polymerization, coupling the cross-linking groups via cross-linking agent, and forming polymerization parts configured by first polymerization parts and second polymerization parts to obtain a plurality of polymers in a second process.

10. The manufacturing method of an electrophoretic particle according to claim 9,
wherein in the second process, the cross-linking groups are linked via the cross-linking agent prior to the polymerization of the second monomers.

11. Electrophoretic dispersed liquid comprising:
the electrophoretic particle according to claim 1.

12. Electrophoretic dispersed liquid comprising:
the electrophoretic particle according to claim 2.

13. Electrophoretic dispersed liquid comprising:
the electrophoretic particle according to claim 3.

14. Electrophoretic dispersed liquid comprising:
the electrophoretic particle according to claim 4.

15. Electrophoretic dispersed liquid comprising:
the electrophoretic particle according to claim 5.

16. Electrophoretic dispersed liquid comprising:
the electrophoretic particle according to claim 6.

17. Electrophoretic dispersed liquid comprising:
the electrophoretic particle according to claim 7.

18. An electrophoretic sheet comprising:
a substrate; and
a plurality of constituents which are arranged above the substrate to respectively accommodate the electrophoretic dispersed liquid in claim 11 therein.

19. An electrophoretic apparatus comprising:
the electrophoretic sheet according to claim 18.

20. Electronic equipment comprising:
the electrophoretic apparatus according to claim 19.

* * * * *